United States Patent [19]

Keating

[11] Patent Number: 5,078,299

[45] Date of Patent: Jan. 7, 1992

[54] APPARATUS FOR THE PERIODIC AND CONTROLLED DISPENSING OF TABLETS SUCH AS CHLORINE PELLETS

[76] Inventor: Scott P. Keating, 285 Farber Dr., Payette, Id. 83661

[21] Appl. No.: 652,086

[22] Filed: Feb. 7, 1991

[51] Int. Cl.$^5$ .............................................. B65G 49/00
[52] U.S. Cl. ..................................... 221/186; 221/258
[58] Field of Search ............... 221/186, 188, 189, 266, 221/258, 15, 204, 265, 277; 210/198.1

[56] References Cited

U.S. PATENT DOCUMENTS

| | | | |
|---|---|---|---|
| 2,731,268 | 1/1956 | Raisen | 221/188 |
| 3,759,419 | 9/1973 | Iseli | 221/186 |
| 3,785,525 | 1/1974 | Handeland | 221/15 |
| 4,316,553 | 2/1982 | Persson | 221/186 |
| 4,662,538 | 5/1987 | Goudy et al. | 221/15 |

Primary Examiner—H. Grant Skaggs
Attorney, Agent, or Firm—William J. Bethurum

[57] ABSTRACT

Apparatus for dispensing chlorine pellets and the like into a well or other liquid container. The apparatus comprises a hollow cylindrical body having a grooved passageway therein and further having an end plate with a gate opening therein communicating with the passageway. The gate opening has a cross sectional dimension which is greater than that of the diameter of a single chlorine pellet, but smaller than that of two chlorine pellets, thereby allowing the removal of a single chlorine pellet from the gate opening once during each 360° rotation of the cylindrical body. This motion further causes the next-in-line pellet to drop back into the cylindrical body once each such rotation thereof. A removable cap is mounted at the other end of the cylindrical body and is used for loading pellets into the cylindrical body. Advantageously, the removable cap is configured so as to receive the drive shaft of a small low horsepower motor which is used to drive the cylindrical body at a controlled rotational speed of typically about one revolution per minute when the well pump is running.

4 Claims, 4 Drawing Sheets

APPARATUS FOR THE PERIODIC AND CONTROLLED DISPENSING OF TABLETS SUCH AS CHLORINE PELLETS

TECHNICAL FIELD

This invention relates generally to apparatus for controlling the distribution of small tablets or pellets into certain bodies of water, and more particularly to such apparatus for distributing chlorine pellets into wells or other similar bodies of a liquid to be purified.

BACKGROUND ART

Hitherto, various complicated, expensive and difficult-to-maintain mechanical systems have been constructed and operated to dispense chlorine pellets and the like into controlled and purified bodies of water in order to maintain the bacteria count therein below an acceptable level. Examples of such prior art mechanical systems may be found in U.S. Pat. No. 4,235,849 issued to Handeland, in U.S. Pat. No. 4,676,399 issued to Burckhardt, and in U.S. Pat. No. 4,694,900 issued to Behrens.

Generally speaking, the pellet dispensing systems of the above three prior art patents have been frequently subject to malfunction as a result of the fact that their operation requires that the pellet be first dropped into a slot and then moved with sliding friction across a flat surface before being dropped into a gate opening. This action causes the pellets to be ground down and thereby create a substantial amount of chlorine pellet dust. The apparatus of these prior art patents are not equipped with means for adequately eliminating the pellet dust, and thus the accumulated dust can place an unacceptable load on the drive motor, clog up the system, and render it inoperative.

In addition, the apparatus of U.S. Pat. No. 4,676,399 requires a substantial amount of disassembly in order to control motor speed and the regularity or periodicity of pellet dispensation, whereas the apparatus of U.S. Pat. No. 4,235,849 operates in such a manner that the volume of pellets stacked on a rotational disk produces a pressure imbalance in the apparatus and in turn frequently causes the jamming of pellets therein. Moreover, the apparatus of U.S. Pat. Nos. 4,694,900 and 4,235,849 require a major disassembling effort in order to correct malfunctions therein, and the apparatus of U.S. Pat. No. 4,676,399 requires some, although not as much, disassembling as in the case with the apparatus of U.S. Pat. Nos. 4,694,900 and 4,235,849. Furthermore, all of the above prior art apparatus and dispensing systems operate so that a malfunction within the interior of the apparatus, such as chlorine pellets jamming at a gate opening, load down the motor shaft which operates to drive the apparatus at a controlled speed. This characteristic in turn causes, among other things, undue wear on the motor and can produce an irregularity in the chlorine pellet dispensation process.

DISCLOSURE OF INVENTION

The general purpose and principal object of the present invention is to provide a new and improved pellet dispensation apparatus which is operative to overcome the above and many other related disadvantages of known prior art pellet dispensation apparatus, while simultaneously reducing the cost of the pellet dispensation apparatus construction relative to any known related prior art apparatus.

Another object of the this invention is to provide a new and improved chlorine pellet dispensation apparatus of the type described which is easy to maintain and operate such that a malfunction or pellet jam therein has absolutely no effect at all on the motor control and drive system used for driving the apparatus.

Another object of this invention is to provide a new and improved chlorine pellet dispensation apparatus of the type described which is operative so that pellet dust does not accumulate to any significant degree and which in any case may be easily removed from the apparatus and has no adverse effect on the motor control for the apparatus.

Another object of this invention is to provide a new and improved chlorine pellet dispensation apparatus of the type described which is elegantly simple and straightforward in construction, reliable in operation and has an extremely high price/performance figure of merit.

In significant contrast to the above mechanically complex apparatus of the prior art, the pellet dispensation apparatus constructed in accordance with the present invention may be maintained to correct a malfunction, such as pellet jamming, merely by removing an end cap from a pellet containing cylinder and washing out the interior of the cylinder with water. This fact, together with the fact that pellet jamming or other apparatus malfunction has absolutely no effect on motor control, constitute two extremely novel and advantageous features of the present invention.

The above purpose, objects, features, and related advantages are accomplished by the provision of, among other things, a hollow cylindrical body having a removable cap at one end thereof and used in the loading of pellets into the hollow cylindrical body. The removable cap is configured so as to operatively receive a motor drive shaft for driving the hollow cylinder at a controlled rotational speed. The hollow cylinder is further provided with a spiral shaped grooved path within an interior wall thereof which is somewhat larger in its width dimension than the diameter of pellets to be dispensed. An opposite end wall or plate is used to cover the other end of the cylinder and it has a gate opening therein which is larger than the diameter of a single pellet, but smaller in cross section dimension than the diameter of two pellets. This gate opening communicates with an exit passageway of the grooved path within the wall of the cylinder, and a shelf member is mounted adjacent the interior surface of the end plate and also adjacent to both the gate opening in the end plate and the exit passageway of the groove. During each 360° rotation of the cylinder, a single pellet will move from the exit passageway of the groove and onto the shelf member and be there maintained until the gate opening reaches a predetermined angle with respect to horizontal. At this point, the force of gravity will cause the pellet to drop from the gate opening and away from the cylinder and will also cause the next-in-line pellet to drop back into the interior of the cylinder, thereby resulting in the dispensation of a single pellet from the cylinder during each 360° rotation thereof.

The above brief summary of the present invention, together with its many useful objects, features, and related advantages will become more readily apparent in the following description of the accompanying drawings.

DETAILED DESCRIPTION OF THE PREFERRED EMBODIMENT

Figure 1:
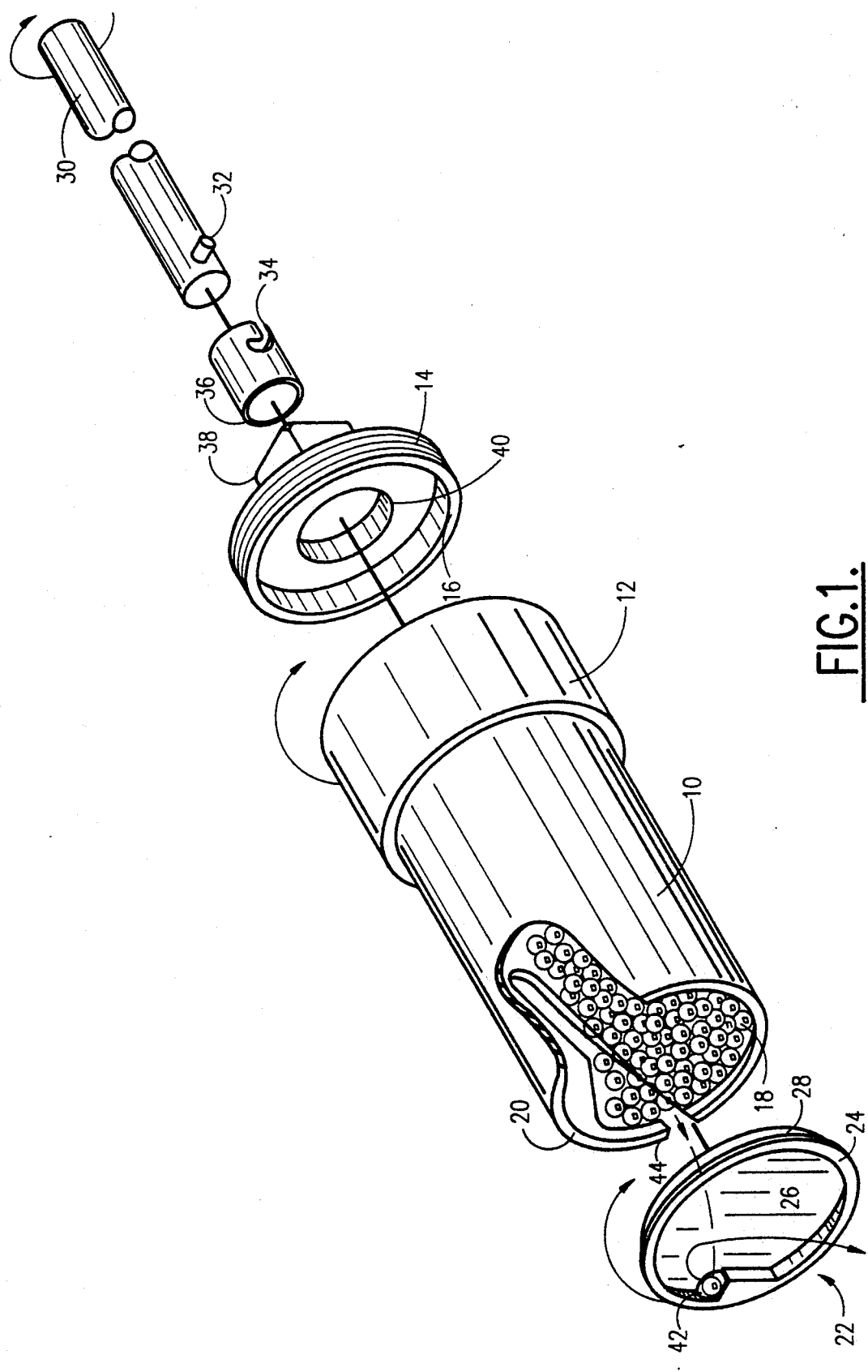
FIG. 1 is an exploded isometric view showing the chemical tablet dispenser according to a preferred embodiment of the invention.

Referring now to FIG. 1, there is shown in an exploded isometric view all of the essential and main parts which together form the chemical tablet or pellet dispensing apparatus in accordance with a preferred embodiment of the invention. This apparatus includes a main cylindrical barrel 10 having an end shroud or sleeve portion 12 joined to one end thereof, and the end shroud 12 has a threaded interior surface (not shown) adapted to receive the mating screw threads 14 of an end cap 16. The end cap 16 is readily removable from the end shroud 12 when it is desired to fill the main cylindrical barrel 10 with a rather large quantity of chlorine tablets or pellets 18 as shown.

The near facing cylindrical end wall 20 of the main cylindrical barrel 10 is configured to receive a mating end plate which is generally designated as 22. The end plate 22 includes an outer peripheral cylindrical wall portion 24 and a recessed inner wall portion 26 which are joined by an orthogonal cylindrical sidewall 28.

The container assembly shown in FIG. 1 and including the main barrel 10, the end shroud 12 and the end cap 16 and end plate 22, respectively, are driven at a controlled rotational speed by a small horsepower motor (not shown) which is mechanically joined to drive the elongated motor drive shaft 30 at a slow and controlled rotational speed typically on the order of about one revolution per minute when the well pump is running. The motor drive shaft 30 will typically have an adjoining tab member 32 positioned as shown to be received in a catch or groove 34 in a cylindrical sleeve member 36. The cylindrical sleeve member 36 is in turn mechanically coupled as indicated generally at 38 to an end opening 40 in the end cap 16.

The end plate 22 is configured to be press fitted into the end wall 20 of the main cylinder barrel 10 and there positioned so that the gate opening 42 therein is located directly adjacent to and mating with the opening 44 of the ink feed slot 46 and 48 within the cylindrical sidewall of the main cylinder barrel 10.

Figure 2:
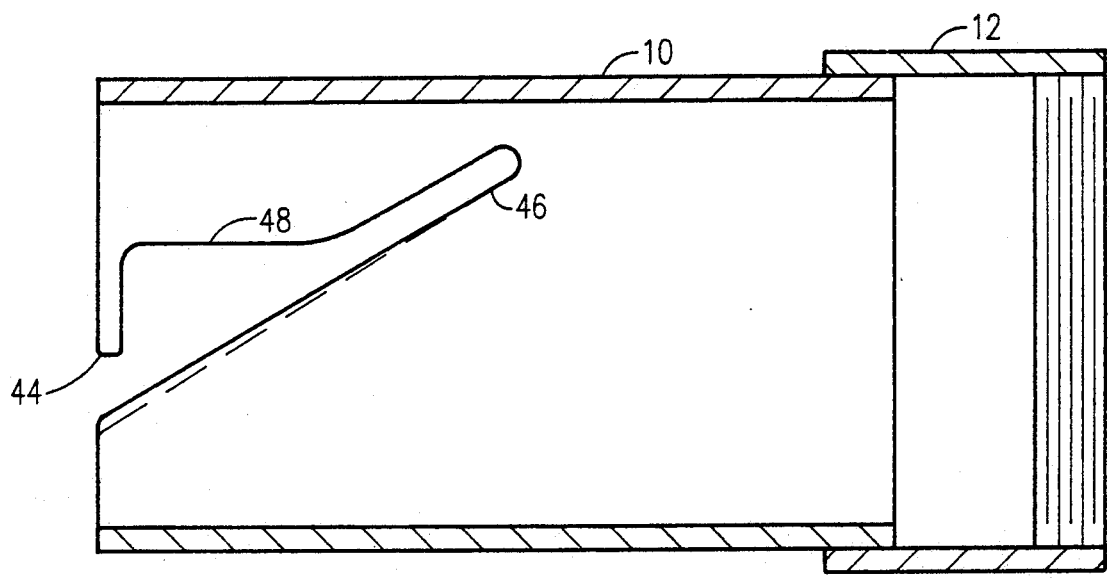
FIG. 2 is a cross-section view taken along lines 2—2 of FIG. 1 and showing the preferred geometry of the tablet or pellet feed slot configured within a wall portion of the main cylindrical barrel of the dispenser in FIG. 1.

Referring again to FIG. 1, together with the cross-sectional view in FIG. 2, the geometrical configuration of the pellet feed slot is seen to consist of a narrow angled section 46 which feeds into a larger mouth or exit opening 48, and the larger exit opening 48 ensures that there will always be an adequate source of pellets immediately adjacent to the end wall opening 44 for feeding the pellets up onto the porch or shelf area 50 within the interior cylindrical sidewall 28 of the end plate 22.

Figure 3A:
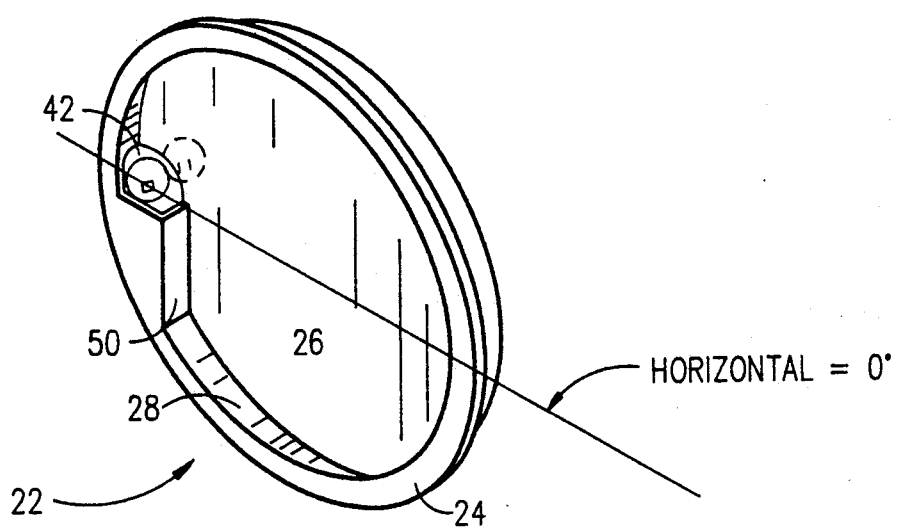
FIGS. 3A through 3C illustrate, respectively, three different angular positions for the end plate of the dispenser in order to specifically illustrate the one-at-a-time pellet or tablet dispensing action during each 360° rotation of the apparatus shown in FIG. 1.
Figure 3B:
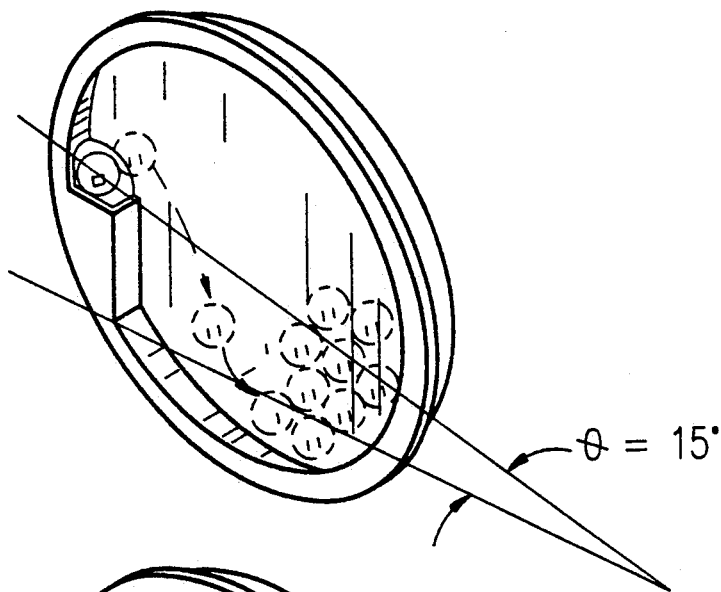
Figure 3C:
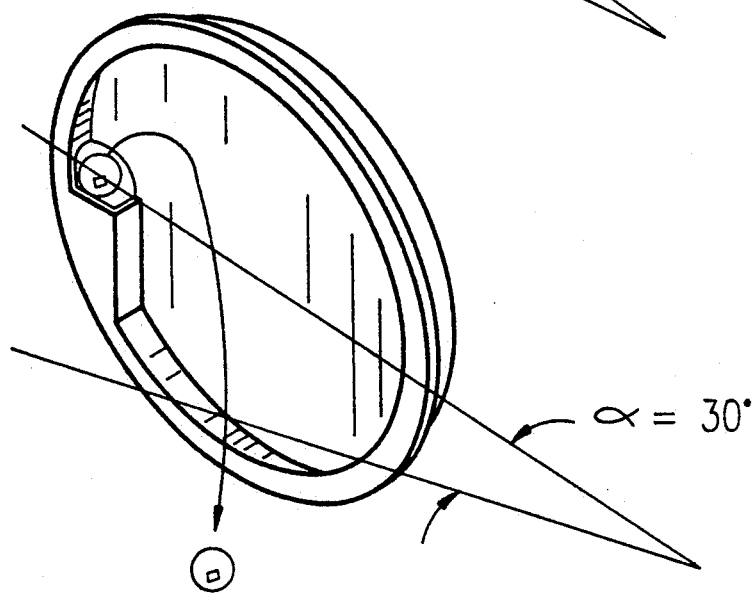
Figure 4:
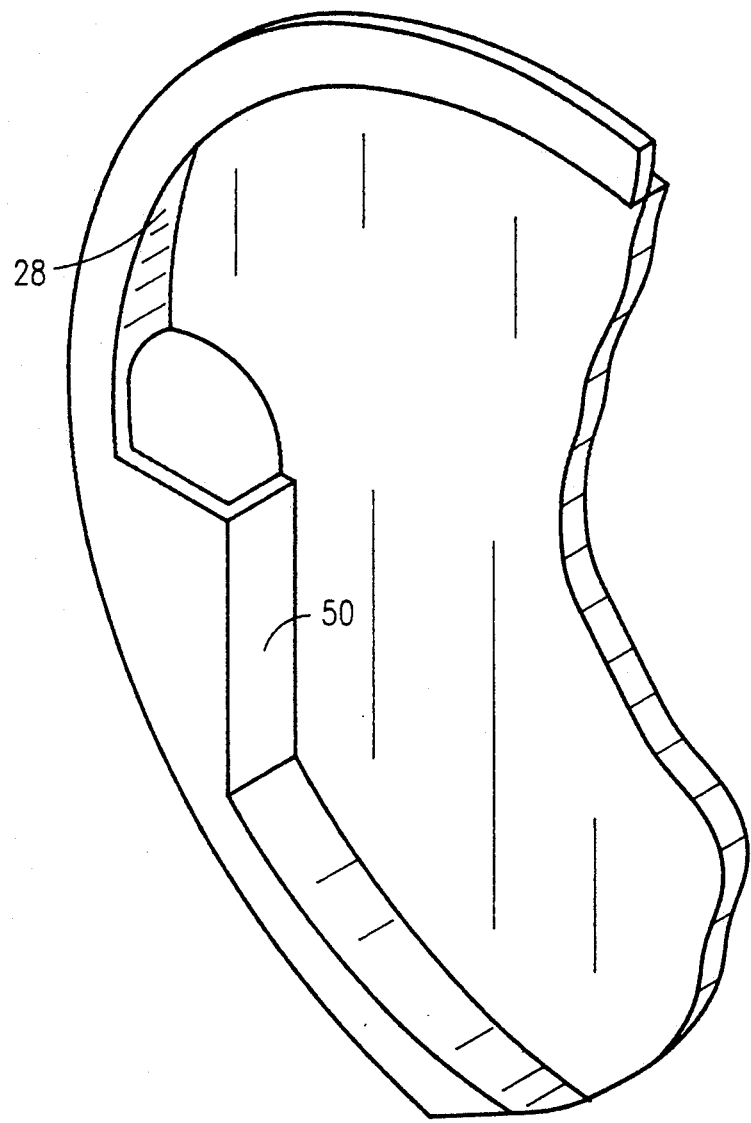
FIG. 4 is a greatly enlarged and fragmented isometric view showing the specific geometry of the porch or shelf area within the end plate member of FIG. 1 and the gate opening or "gate" to which the porch or shelf is integrally joined.

Referring now to FIGS. 3A through 3C, together with the enlarged fragmented isometric view of FIG. 4, the shelf 50 is configured to receive a single adjacent or end pellet 50 each 360° rotation of the main cylinder barrel 10 and its attached end plate 22. When the end plate 22 is rotating clockwise and reaches a position where the pellet 52 and shelf surface area 50 are at approximately a horizontal position, there is insufficient gravity acting on the pellet 52 to cause it to drop vertically into a well or container being treated. At this horizontal position shown in FIG. 3A, the next in line pellet 54 abuts against the adjacent surface of the first in line pellet 50 and has been in that abutting position prior to rotating clockwise to the substantially horizontal position indicated in FIG. 3A.

Then, as the end plate 22 continues to rotate clockwise through horizontal and to an angle 8 of approximately 15° as shown in FIG. 3B, the next-in-line pellet 52 will, as a result of gravity, fall back into the main cylinder barrel 10. Since the width dimension or opening of the gate 42 is smaller than the diameters of two pellets, this feature ensures that only the first-in-line pellet 52 is allowed to be dispensed for each 360° rotation of the main cylinder barrel. Thus, the next-in-line pellet 54 will drop back into the barrel when the end plate 22 traverses through an angle of approximately 15° with respect to horizontal as shown in FIG. 3B.

Then, as indicated in FIG. 3C, when the end plate 22 continues its rotation on up to about a 30° angle $\beta$ with respect to horizontal, the gravity pull on the first-in-line pellet 52 is sufficient to cause it to fall downwardly as indicated by the arrow 56 in FIG. 3C and thereby fall into the container or well being treated.

Thus, there has been described an elegantly simple chemical tablet or pellet dispenser wherein the rotational movement thereof and the motion of pellets or tablets therein can have no effect whatsoever on loading down the motor to which the drive shaft 30 is connected. In addition, the apparatus shown in the accompanying drawings may be easily disassembled and readily cleaned and reassembled during periodic intervals of use in order to rapidly and easily clean pellet dust from the interior of the main cylinder barrel 10 merely by washing it out with water.

Accordingly, it will be understood and appreciated by those skilled in the art that various design modifications may be made to the above described geometries of the pellet feed slots 44, 46, and 48 and to the geometries of the gate shelf or porch region 50 and the adjoining gate opening 42 without departing from the spirit and scope of the following appended claims.

I claim:

1. Apparatus for the periodic and controlled dispensing of tablets such as chlorine pellets including, in combination:
   a. a hollow cylindrical body having a removable cap at one end thereof and used in the loading of pellets into said cylinder,
   b. a grooved path within an interior wall of said cylinder and being somewhat larger in width dimension than the diameter of pellets to be dispensed,
   c. an end plate covering the other end of said cylinder and having a gate opening therein somewhat larger in cross sectional dimension than the diameter of one pellet but smaller in cross sectional dimension than the diameter of two pellets, said gate opening communicating with an exit passageway portion of said groove, d. a shelf member mounted adjacent to said gate opening and to the interior surface of said end plate and also adjacent to an end of said exit passageway, where upon each complete rotation of said cylinder will cause a single pellet to move onto said shelf and be there maintained until said gate opening reaches a predetermined angle with respect to horizontal, at which time the force of gravity will cause said pellet to drop from said gate opening and away from said cylinder and will also cause the next-in-line pellet to drop back into the interior of said cylinder and thereby result in the dispensation of a single pellet from said cylinder during each 360° rotation thereof.

2. The apparatus defined in claim 1 wherein said removable end cap is configured to receive a motor shaft for driving said cylinder at a controlled rotational speed, whereby any motion within said cylindrical body has no effect or loading on said motor drive shaft during the operation of said apparatus.

3. The apparatus defined in claim 1 wherein said groove within said interior wall of said cylinder is a spiralled groove which terminates into said exit passageway which serves to interconnect said groove with said shelf member and said gate opening, said exit passageway having one or more tapered side walls extending to the proximity of both sides of said gate opening and providing a path for pellets to travel onto a surface of said shelf member once during each 360° rotation of said cylinder.

4. The apparatus defined in claim 3 wherein said gate opening is located in an outer wall of said end plate, and the surface of said shelf member is perpendicular to the plane of said gate opening and to said end wall in which said gate opening is located.

* * * * *